(No Model.)
A. GALE & E. TREMBLAY.
ROLLING COLTER.
No. 420,051. Patented Jan. 28, 1890.
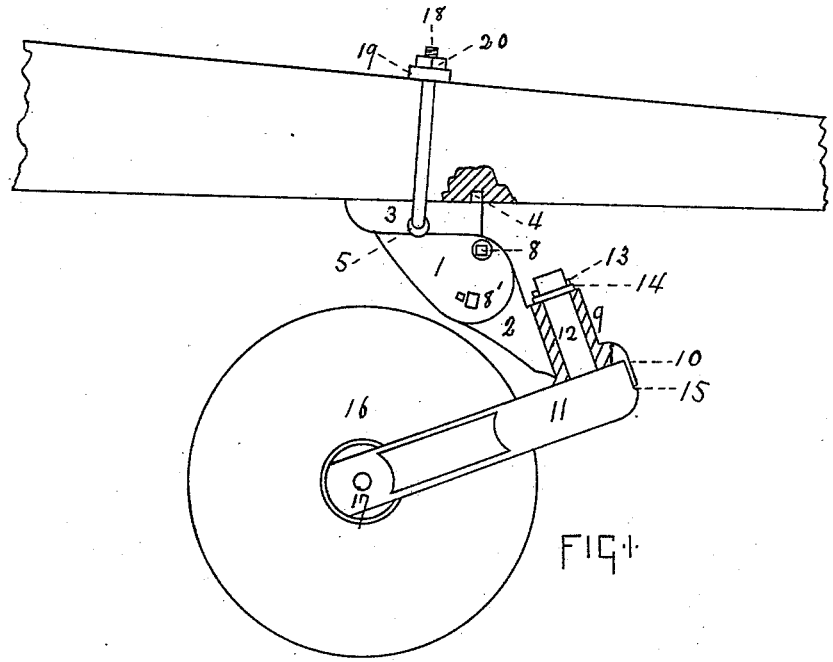
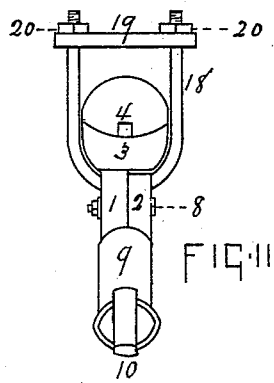
FIG. II.
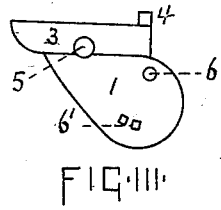
FIG. III.
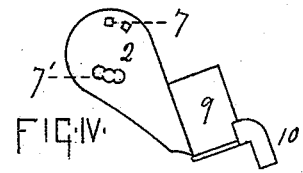
FIG. IV.
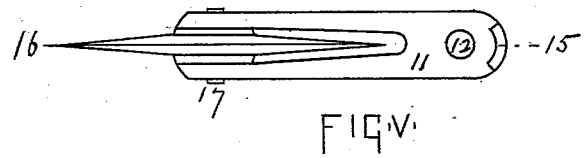
FIG. V.
WITNESSES:
Stillman B. Call
Mrs Mamie A. Call
Andrew Gale
Eucher Tremblay
INVENTORS
BY
Sidney Sanders.
ATTORNEY

United States Patent Office.

ANDREW GALE AND EUCHER TREMBLAY, OF CHICOPEE, MASSACHUSETTS.

ROLLING COLTER.

SPECIFICATION forming part of Letters Patent No. 420,051, dated January 28, 1890.

Application filed November 14, 1889. Serial No. 330,327. (No model.)

*To all whom it may concern:*

Be it known that we, ANDREW GALE and EUCHER TREMBLAY, both citizens of the United States, and both residing at Chicopee, in the county of Hampden and Commonwealth of Massachusetts, have made and invented a new and useful Improvement in Rolling Colters, adapted especially to swivel-plows, the object thereof being to provide a practical colter of few and durable parts, which shall be adjustable vertically, so as to cut a deep or shallow gash and prepare for a deep or shallow furrow, and which shall have a certain limited amount of lateral swing or play, so as not to interfere with or prevent lateral motions of the plow-beam.

The following is a specification of our invention, reference being had to the accompanying drawings, in which like numbers mark like parts, and in which—

Figure I is a sectional side elevation of our improved colter, showing the same as attached to a plow; Fig. II, a front elevation of the shank and binding loop or staple, whereby the colter is attached to the plow-beam; Fig III, a side elevation of the superior disk and upper part of the shank; Fig. IV, a side elevation of the inferior disk and lower part of the shank, and Fig. V a plan of the colter proper and fork wherein it runs.

In carrying out our invention we make the shank in two parts, the central portion of it consisting of two overlapping disks 1 and 2. We provide disk 1 with a head 3, adapted to press against the plow-beam, and a pin or dowel 4, projecting therefrom into the beam. We also provide disk 1 with a loop-hole 5 and with opposite sets of adjustment-holes 6 and 6'. We also provide disk 2 with similar sets of correlated holes 7 and 7', through which pass the bolts 8 and 8', which connect and bind the disks firmly together. On the lower front portion of disk 2 we form the socket 9, from which projects the nose-piece 10. We also provide the fork 11, from the forward part of which projects the arbor 12, adapted to enter and turn in the socket 9, wherein it is secured by the pin and washer 13 and 14. In the forward end of fork 11 we form a slot or recess 15, adapted to receive the nose-piece 10, which combine and act together to limit the lateral swing or play of the fork and colter proper. We also provide the colter proper 16 of the usual make, which is held in fork 11 by the pin or axle 17. To attach the colter to a plow we provide the binding loop or staple 18, collar 19, and nuts 20 20', and inserting loop 18 in hole 5, and pin 4 in the beam-recess provided therefor. We adjust the collar 19 above the beam and bind the whole together by means of the nuts 20 20'.

It is obvious that within certain limits the colter will swing or play and adjust itself laterally and may be adjusted vertically by changing the position of the adjustment-bolts 8 and 8', one or both, in holes 6 7 and 6' 7'. If bolt 8 be regarded as the central or turning point, then by changing the position of bolt 8' in holes 6' and 7', one or both, the colter is raised or depressed to suit the convenience of the operator, and if bolt 8' be regarded as the central or turning point, the same kind of effect is produced by changing the position of bolt 8; and by employing two central or turning points, as above indicated, large or very small changes may be made in the depth of the gash cut by the colter proper 16, and we thus produce a practical rolling colter of few and durable parts, readily adjusted vertically, and readily attached to or detached from the plow.

What we claim as new is—

1. The disks 1 and 2, provided with correlated adjustment-holes 6 and 7 and 6' and 7', and the bolts 8 8', in combination with the fork 11 and colter 16, substantially as specified.

2. The disks 1 and 2, connected by the bolts 8 8', the disk 2, having a socket 9 and nose-piece 10, in combination with the fork 11, having the arbor 12 and recess 15, and the colter proper 16, substantially as specified.

ANDREW GALE.
EUCHER TREMBLAY.

Witnesses:
STILLMAN B. CALL,
SIDNEY SANDERS.